US008746422B2

(12) United States Patent
Zimmer et al.

(10) Patent No.: US 8,746,422 B2
(45) Date of Patent: Jun. 10, 2014

(54) COMBINED DECELERATION AND ACCELERATION DEVICE

(76) Inventors: Günther Zimmer, Rheinau (DE); Martin Zimmer, Rheinau (DE)

(*) Notice: Subject to any disclaimer, the term of this patent is extended or adjusted under 35 U.S.C. 154(b) by 423 days.

(21) Appl. No.: 12/456,040

(22) Filed: Jun. 10, 2009

(65) Prior Publication Data

US 2009/0273129 A1 Nov. 5, 2009

Related U.S. Application Data

(63) Continuation-in-part of application No. PCT/DE2007/002214, filed on Dec. 10, 2007.

(30) Foreign Application Priority Data

Dec. 11, 2006 (DE) ........................ 10 2006 058 639

(51) Int. Cl.
*F16D 69/00* (2006.01)
*F16D 65/00* (2006.01)

(52) U.S. Cl.
USPC ....................... 188/265; 188/322.19; 312/333

(58) Field of Classification Search
USPC ................ 188/265, 322.16, 322.19; 248/636; 16/49, 66, 84; 312/333, 330.1, 334.1, 312/319.1, 319.2
See application file for complete search history.

(56) References Cited

U.S. PATENT DOCUMENTS

| | | | | |
|---|---|---|---|---|
| 2,681,263 | A * | 6/1954 | Angelillo | 312/290 |
| 6,340,078 | B1 * | 1/2002 | Scheible | 188/166 |
| 7,854,485 | B2 * | 12/2010 | Berger | 312/333 |
| 2001/0008037 | A1 | 7/2001 | Brustle | |
| 2003/0234604 | A1 | 12/2003 | Lin | |
| 2006/0238089 | A1 * | 10/2006 | Prentner et al. | 312/333 |

FOREIGN PATENT DOCUMENTS

| | | |
|---|---|---|
| DE | 201 07 426 U1 | 10/2001 |
| DE | 203 15 124 U1 | 4/2004 |

* cited by examiner

*Primary Examiner* — Melody Burch
(74) *Attorney, Agent, or Firm* — Klaus J. Bach

(57) ABSTRACT

In a combined deceleration and acceleration device for the controlled closing and opening of, for example, furniture parts, a base part consisting of a cylinder and a guide structure is provided wherein a drag element is movably supported by the guide structure, and a piston with a piston rod is connected to the drag element which has a park position remote from the cylinder and is biased by an energy storage structure toward the cylinder for moving the piston into the cylinder in a controlled decelerating manner while carrying along the drag element and a movable part engaged with the drag element.

13 Claims, 2 Drawing Sheets

COMBINED DECELERATION AND ACCELERATION DEVICE

This is a Continuous-In-Part Application of pending international patent application PCT/DE2007/002214 filed Dec. 10, 2007 and claiming the priority of German patent application 10 2006 058 639.5 filed Dec. 11, 2006.

BACKGROUND OF THE INVENTION

The invention resides in a combined deceleration and acceleration device with a drag element which is movable along a guide structure from a force- or form-locking park position to an opposite end position. The deceleration device comprises a pneumatic or hydraulic piston cylinder unit whose piston rod is connected to the drag element and the acceleration device comprises an energy storage structure which is connected to the drag element and is charged in the park position. Also, a guide system is provided which includes such a deceleration and acceleration device.

It is the object of the present invention to provide a combined deceleration and acceleration device and a guide structure including such a deceleration and acceleration device which comprises a relatively small number of parts and which can be easily and rapidly assembled.

SUMMARY OF THE INVENTION

In a combined deceleration and acceleration device for the controlled closing and opening of, for example, furniture parts, a base part consisting of a cylinder and a guide structure is provided wherein a drag element is movably supported by the guide structure, and a piston with a piston rod is connected to the drag element which has a park position remote from the cylinder and is biased by an energy storage structure toward the cylinder for moving the piston into the cylinder in a controlled decelerating manner while carrying along the drag element and a movable part engaged with the drag element.

The invention will become more readily apparent from the following description of a particular embodiment of the deceleration and acceleration device according to the invention on the basis of the accompanying drawings.

DESCRIPTION OF AN EXEMPLARY EMBODIMENT

Figure 1:
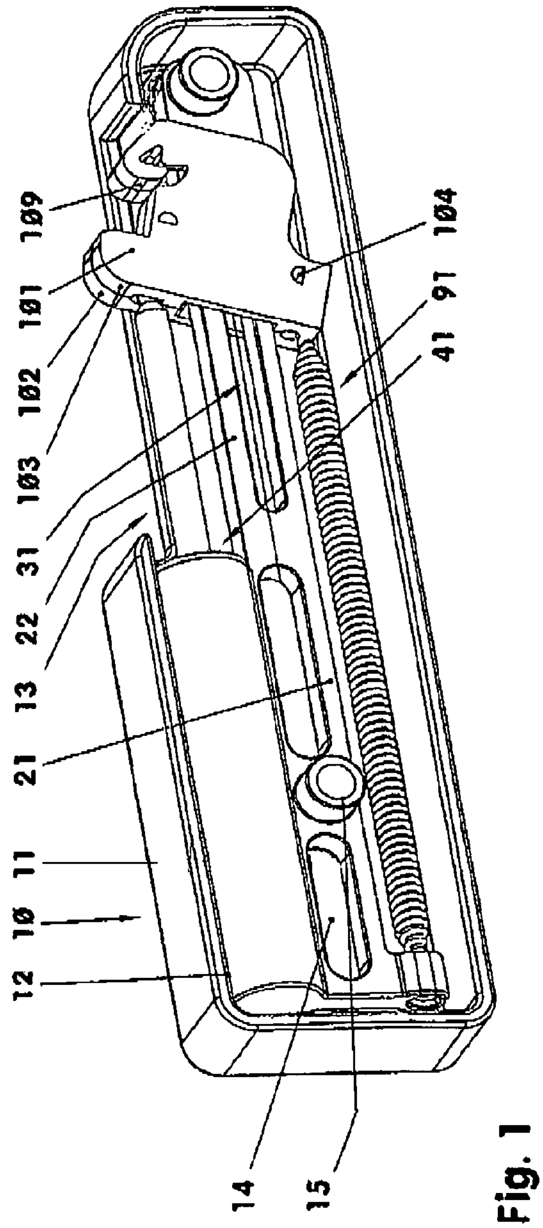
FIG. 1 shows the deceleration and acceleration device in a park position.
Figure 2:
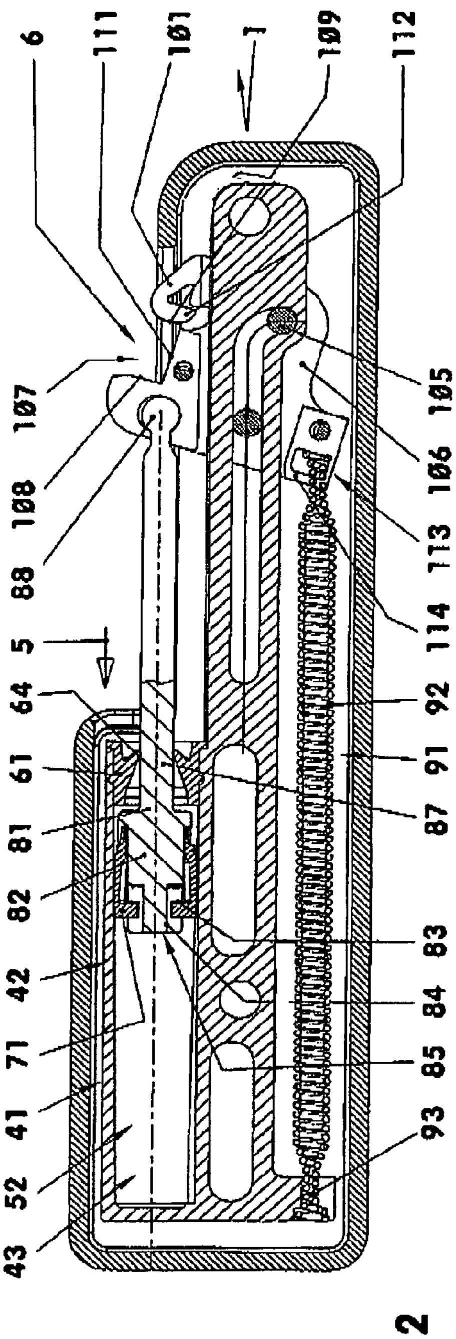
FIG. 2 is a longitudinal cross-section view of the device as shown in FIG. 1.
Figure 3:
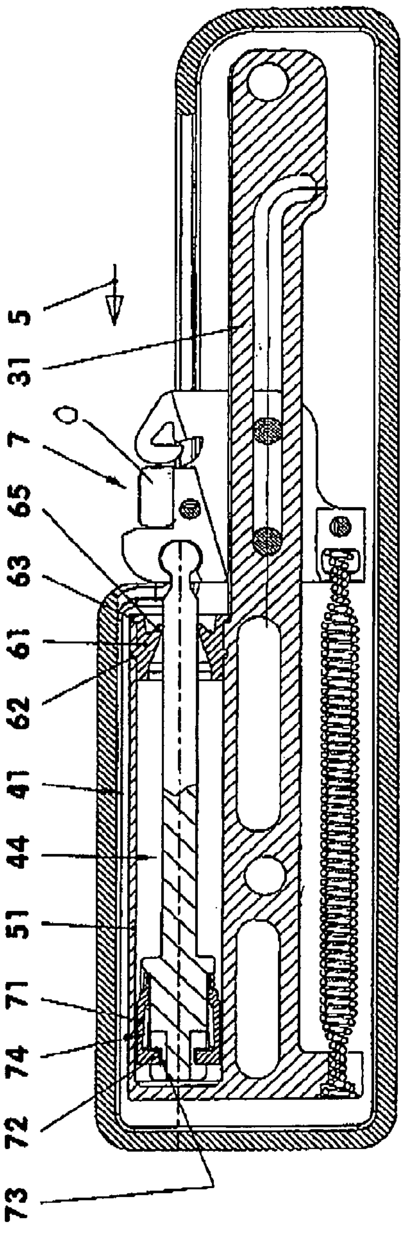
FIG. 3 shows the deceleration and acceleration device in a retracted end position.

FIGS. 1-3 show a combined deceleration and acceleration device 10 with a drag element 101 in a park position 6, see FIGS. 1 and 2 and in an end position 7—see FIG. 3. FIG. 1 is a perspective view of the deceleration and acceleration device 10, FIGS. 2 and 3 are longitudinal cross-sectional views of the device 10.

The combined deceleration and acceleration device 10 shown here is for example part of a guide system for example for a drawer of a piece of furniture or a sliding door. In such a guide system, the combined deceleration and acceleration device 10 is for example mounted on a furniture piece in which the drawer is relatively movably supported. The drawer is then provided with an operating element. For example, during closing of the drawer the operating element comes, when approaching the closed end position of the drawer, in contact with the drag element 101 of the deceleration and acceleration device 10. The operating element then releases the drag element 101 from the force- and/or form-locking engagement in the park position 6. The drag element is then guided in the return direction 5 along a guide structure 31 to its end position 7. During this process, the stroke movement of the drawer relative to the furniture piece is retarded by the deceleration structure 41. For example, with the release of the drag element 101 from the park position 6 the acceleration structure 91 is activated which retracts the drawer for example into the closed end position against the counterforce generated by the deceleration structure 41. The deceleration and acceleration device 10 remains in this step in engagement with the operating element of the drawer until the drawer has reached its closed end position. Of course, such a deceleration and acceleration device 10 may also be used during opening of the drawer for retarding and moving the drawer to its open end position.

It would of course also be possible to attach the operating element to the furniture piece and the combined deceleration and acceleration device 10 to the drawer.

The deceleration and acceleration device 10 comprises a housing 11 in which the deceleration structure 41, the acceleration structure 91, the guide structure 31 and the drag element 101 are arranged.

The housing 11 encloses the arrangement except for the support face area 12 and the opening 13 for the drag element 101. The support face 12 herein is the side in FIG. 1 facing the viewer. The On the inner surface 14 of the housing 11 facing away from the support face 12 two bolts 15 are mounted, which project toward the support race 12. The support face 12 of the housing 11 may also expediently be closed by a lid.

Figure 4:
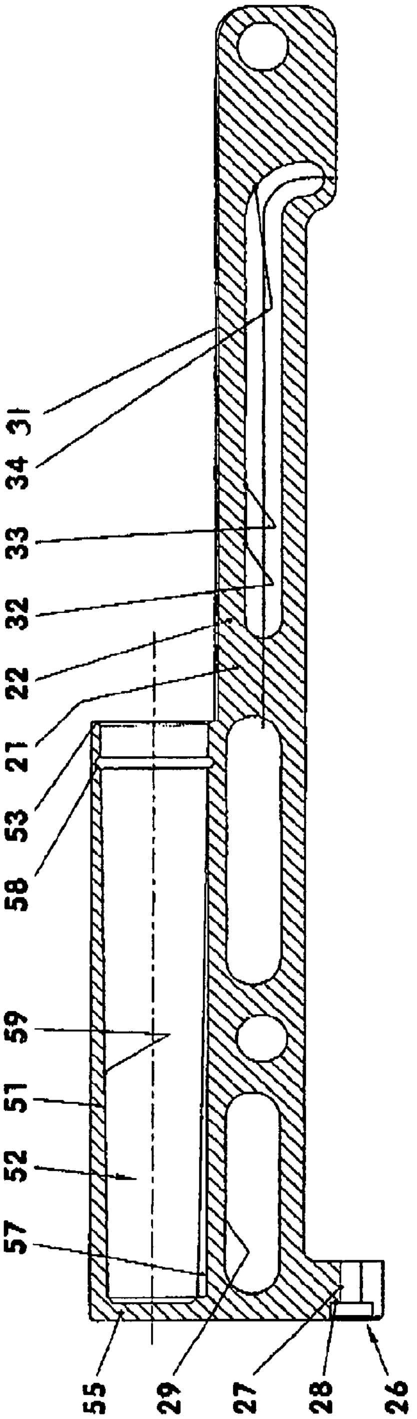
FIG. 4 shows a major component of the device.

On the bolt 15, a base component 21 is for example disposed in a form- and/or force-locking manner. This base component 21, see FIG. 4, comprises a cylinder 51, a carrier 22 with an elongated guide opening 32 and a spring receiver 26. The cylinder 51 is arranged in the embodiments of FIGS. 1-4 above the elongated opening 32 and is displaced relative thereto in the return direction 5. The cylinder 51, which in the shown embodiment is open at one end thereof—the opening points in the direction of the elongated guide opening 32—extends parallel to the elongated opening 32.

The cylinder 51 has for example a closed end 55. The interior space 52, which is open at the front end 53 of the cylinder and becomes cone-like narrower toward the closed end 55 of the cylinder, has in the shown embodiment a maximum diameter of 9 mm and a depth of 50 mm. The inner cylinder wall 59 is provided with a longitudinal groove 57, which extends to the closed end 55 of the cylinder and which has a length of 85% of the length of the cylinder interior space 52. The longitudinal groove 57 has for example a constant width and its bottom wall extends for example parallel to the center axis of the cylinder 51. The inner cross-section of the cylinder 51 decreases for example toward the cylinder bottom end 55. However, the inner cross-section may also be constant over the length of the cylinder interior 52 or increase toward the cylinder bottom end 55. The cylinder may also have an oblong square, elliptical, polygonal etc., internal cross-section.

The elongated guide opening 32 has for example a width of three millimeters and comprises a straight section 33 and a curved section 34. The straight section 33 has in the embodiment shown here a length of 35 mm. The following curved section 34 which is remote from the cylinder 51 comprises a downwardly curved quarter of a circle as shown in FIGS. 1 to 4.

The spring receiver 26 comprises a longitudinal groove 27 and a retaining neck 28. Both are for example U-shaped in a front view of the base component 21. The spring receiver 26 is arranged in the representations of FIGS. 1-4 below the cylinder end 55.

The base part 21 furthermore has for example two elongated openings 29 in order to reduce the mass of the part.

The cylinder 51 is part of a cylinder-piston unit 42 which in the shown embodiment comprises a piston rod unit 81 and a piston seal element 71.

The piston-piston rod unit 81 is a single-piece component which consists at least of a piston 82 and a piston rod 87 formed integrally therewith. The piston 82 has a circumferential groove 83 which is for example in communication with two channel-like axial grooves 84 formed in the piston 82. The axial grooves 84 are deeper than the annular groove 83 and extend through the annular groove 83.

The piston 82 carries the cylindrical piston seal element 71. The piston seal element 71 is manufactured for example from nitrile butadiene caoutshouc and may have a halogenized surface. Its length is for example 110% of the maximum inner cylinder diameter. The piston seal element 71 is for example engaged, at one end, with the piston 82 and is provided, at its end facing the cylinder bottom end 55, with an inner collar 72 which is received in the annular groove 83 of the piston 82. The axial grooves 84 of the piston 82 provide for communication between the cylinder space 85 in front of the piston 82 and the interior space 73 of the piston seal element 7.

Expediently, the piston-piston rod unit 81 may also comprise a piston seal element 71 formed directly onto the piston-piston rod unit 81. The piston 82, the piston rod 87 and the piston seal element 71 then form an inseparable single-piece component.

The piston rod 87 extends from the cylinder end 53. It has at its end remote from the piston 82 for example a ball-shaped piston rod head 88 which is accommodated in the drag element 101. The diameter of the piston rod head 88 is smaller than, or equal to, the diameter of the piston rod 87. The latter is for example 3.5 mm.

In the shown embodiment, the cylinder end 53 is closed by a cylinder closure element 61. The cylinder closure element 61 is provided for example with an annular flange 62 which is received in an annular groove 58 formed in the inner cylinder wall 59 and has an abutment flange 63 abutting the front end face of the cylinder 51. The cylinder closure element 61 consists in the shown embodiment of an elastically deformable material, for example, of nitrile-butadiene caoutshouc. A central opening 64 is defined by an elastically deformable sealing lip 65 which is in contact with the piston rod 87. As shown in FIGS. 2 and 3, the sealing lip 65 is directed toward the drag element 101. The combined deceleration and acceleration device 10 however is also operative without the cylinder closure element 61.

In the shown embodiment, the drag element 101 comprises two side members 102, 103, which are interconnected by connecting pins 104. In an embodiment without connecting pins 104 one of the side members 102, 103 may be provided with engagement bolts which are, for example, disengageably received in the other side member 102, 103. The two side members 102, 103 accommodate the piston rod head 88 and receive therebetween also the base part 21 in the area of the elongated guide opening 32. In this case, two guide bolts 105 provided on the drag element 101 extend through the elongated guide opening 32. The elongated guide opening 32 consequently forms the guide structure 31 for the drag element 101. The inner space 106 of the drag element 101 through which the base part 21 extends is widened in the area remote from the piston 82. The widening angle in the embodiments shown in FIGS. 2 and 3 is for example 16 degrees.

In the area which extends out of the housing 11; the drag element 101 has an engagement recess 107 which is delimited by two stop shoulders 108, 109 of different height. The higher shoulder 108 which is disposed closer to the piston 82 extends generally shoulder 108 which is disposed closer to the piston 82 extends generally normal to the base surface 111 of the recess 107. The opposite shoulder 109 is formed in the shown embodiment by an elastically deformable hook structure 112. The opening of the hook structure 112 faces toward the guide opening 32. Expediently, the stop shoulder 109 may also be rigid without a hook structure 112.

In the lower area of the drag element 101 as shown in the FIGS. 1 to 3, a spring receiver structure 113 is provided which is in alignment with the spring receiver 26 and is similar in its design. The spring receiving structure 113 of the drag element 101 however is closed at the end opposite an opening 114.

The two side members 102, 103 of the drag element may be mirror-reversed identical. Each individual side member 102, 103 then is provided at its inner and outer side with semibolts which extend into guide grooves and with recesses for accommodating the piston rod head 88.

The drag element 101 may also be formed as a single piece element. It may for example be U-shaped. It is further possible that it is provided for example at its end remote from the cylinder 5, or at its bottom end in the area of the spring receiver structure 113 with an elastic hinge around which it can be folded. The overall number of different components and tools can be further reduced in this way.

The two spring receiver structures 26, 113 accommodate for example a tension spring 92. The spring ends 93 are provided with head structures and abut the retaining necks 28. The spring 92 extends in the shown embodiment parallel to the piston rod 87 and to the straight section 33 of the elongated guide opening 32. The tension spring 92 may also be indirectly supported by the spring receiver structure 26, 113, for example, via intermediate components.

During assembly of the combined deceleration and acceleration device 10, for example first, the piston seal element 71 is mounted onto the piston 82 of the piston-piston rod unit 81 so that the inner collar 72 is received in the circumferential groove 83. If the piston-piston rod unit 81 with integral piston seal element 71 is used, this assembly step is omitted.

This preassembly group is then inserted into the cylinder 51 so that the piston rod 87 extends from the cylinder 51. The cylinder closure element 61 is then slipped onto the piston rod 87 until the annular flange 62 is received in the inner cylinder wall 59 and abuts the abutment flange 63 at the front end surface of the cylinder 51. In an embodiment of the combined deceleration and acceleration device 10 without cylinder closure element 61—that is without piston rod guide structure—this last assembly step is omitted.

After the assembly of the above components, in this embodiment, the piston 82 and the bottom end 55 of the cylinder delimit a compression chamber 43. The piston 82 and the cylinder closure element 61 delimit a compensation chamber 44. The piston seal element 71 and the piston 82 now delimit a pressure chamber 74 which is in communication with the compression chamber 43 via the axial groove 84.

Next, the two side members 102, 103 of the drag element 101 are placed onto the base part 21 in such a way that the guide bolts 105 are received in the elongated guide opening 32. At the same time, the piston rod head 88 and the spring end 93 adjacent the drag element 101 are engaged by the drag element 101. Hereafter, the two side members 102, 103 are joined by means of the connecting pins 104. If the drag element comprises interlocking elements rather than connecting pins 104 or if the drag element is a single part structure, the two side members 102 are joined by interlocking structures.

Upon mounting of the spring 92 in the spring receiver structure 26 of the base part, the pre-assembled unit, that is the unit before its installation in a housing, which unit is symmetrical with respect to a vertical center plane thereof, is inserted into the housing 11 and mounted therein. The overall length of the deceleration and acceleration device 10 is about four times the stroke length of the drag element. The drag element stroke is about three times the cylinder diameter in the shown embodiment.

The complete combined deceleration and acceleration device 10 can be installed for example in a furniture piece. In that case, an operating element is attached for example to a drawer which is movable relative to the furniture piece. The guide elements of the drawer and of the furniture piece including the combined deceleration and acceleration device 10 and the operating element then form a guide system. In order to obtain after installation—the piston rod 87 is originally inserted—a first-time engagement of the operating element, the hook structure is first deformed by the operating element 112 so that the operating element passes over the hook structure into the engagement recess 107 of the drag element 101.

The combined deceleration and acceleration device 10 comprises in the described embodiments, including the housing 11, five to ten components. Up to two of these components may be twice present. The at-least five necessary components are the base part 21, a piston-piston rod unit 81 with integrated seal element, a single-piece drag element 101, an energy storage device 92 and the housing 11. Because of the small number of parts and the simple assembly procedure, the device according to the invention can be assembled in large numbers rapidly and at low cost.

With an automated assembly for example of the drag element 101 by means of an assembly robot, the picking up, placing on top of one another and fitting together of individual components may require less time than for example the bending and joining of an individual component. As a result, upon an overall consideration, the manufacturing costs may be lower in spite of a larger number of components.

When the drawer is open, the deceleration and acceleration device 10 is disengaged from the operating elements The drag element 101 is in the park position 6 so that the base surface 111 extends for example at an angle of 20° with respect to the straight section 33 of the elongated guide opening 32. The stop shoulders 108, 109 are then oriented away from the cylinder 51. The piston unit 81 is extended. The spring 92 is tensioned.

Upon closing the drawer, the operating element contacts the drag element 101 before the drawer reaches the closing end position. The operating element abuts in the process, the stop shoulder 108 disposed closer to the cylinder 51. The drag element is in the process pivoted out of the park position 6. As a result, the rear guide bolts 105 move along the elongated guide opening 32 into the straight section 33. The operating element is then locked to the drag element 101.

The piston rod 87 of the pneumatic deceleration structure 41 is moved under the influence of the external force in a direction 5 into the cylinder. The piston 82 is moved in the cylinder toward the cylinder end wall 55. In the process, the volume of the compression chamber 43 is reduced. The gas pressure, for example, the air pressure in the compression chamber 43 increases and acts as internal force on the piston seal element 71. The piston seal element 71 is pressed against the inner cylinder wall 59 immediately as the piston rod 87 is moved into the cylinder. The compression chamber 43 and the compensation chamber are essentially hermetically isolated from each other. At the same time, a vacuum is generated in the compensation chamber 44 which, in the exemplary embodiment is isolated from the ambient, which vacuum also generates a retarding force and supports the sealing effect of the piston seal element 71. The pressure, which builds up in the compression chamber 43 is also established in the communication grooves 84 and in the pressure chamber 74.

With further movement of the piston rod 87 into the cylinder the piston seal element 71 which is pressed into contact with the inner cylinder wall 59 causes a large deceleration of the piston movement. The movement of the drawer is therefore rapidly slowed down by means of the deceleration structure 41.

As soon as the piston seal element 71 has passed the edge of the longitudinal groove 57, air is discharged from the compression chamber 43 via the throttling groove 57 into the compensation chamber 44. The pressure in the compression chamber 43 drops rapidly. The piston seal element 71 may still be in close contact with the inner cylinder wall 59 or it assumes the position which it had before the beginning of the movement of the piston. The drawer now has a small residual speed.

During the inward stroke movement of the piston rod 87, the energy of the tension spring is released. The acceleration structure 91 provides a return force on the drag element 101 caused by the energy release of the energy storage structure that is the spring 92. At the beginning of the stroke movement, that is, when leaving the park position 6, the amount of the acceleration force in the stroke direction generated by the spring 92 is less than the opposing deceleration force generated by the deceleration structure 91. The return force of the tension spring 92 decreases for example linearly with the stroke.

Toward the end of the stroke, the drawer moves only slowly and with little deceleration to its end position. There, it remains in position without rebound. The tension spring 92 has little residual tension left.

When the drawer is pulled out again, air flows essentially without restriction from the compensation chamber 44 via the longitudinal groove 57 into the compression chamber 43. First, the piston seal element 71 remains essentially unchanged. The outward movement is almost without resistance. However, during the outward movement of the drawer the spring ends 93 are pulled apart whereby the spring 92 is again tensioned that is the energy storage structure is again charged.

When the piston rod 87 is pulled fully outwardly, the drag element 101 is again in the park position 6. The cylinder closure element 61 accommodates the then slightly inclined position of the piston rod 87 so that the cylinder 51 remains closed in any piston position. In the park position of the drag element 101, the operating element is released from the drag element 101. The deceleration and acceleration device 10 is disengaged.

Instead of the pneumatic cylinder piston unit 42, the deceleration structure may include a hydraulic cylinder piston unit which would then communicate at least during a stroke with a compensation chamber arranged within the housing 11.

The deceleration and acceleration device 10 may also comprise a single-piece drag element and a base element extending around the drag element, the base element being provided with elongated guide openings disposed at opposite sides of the drag element 101. The base element may then be a single-piece component or comprise two parts. With a single piece component, the guide bolts may be installed individually during assembly. It would also be possible to bend the guide areas apart during installation of the drag element so that the bolts provided on the drag element can enter the elongated guide openings of the base element and are then firmly engaged therein. The piston rod head may be supported either in the drag element or in a guide bolt. Also in this embodiment, the deceleration and acceleration device including the housing comprises no more than ten components.

It is also possible to provide the combined deceleration and acceleration device 10 with a deceleration structure which slows down the movement of for example the drawer during movement of the piston out of the cylinder. The compression chamber of such a deceleration structure is provided for example between the piston and the piston rod end of the cylinder. The inner collar of the pot-shaped seal element then extends toward the cylinder interior. The curved part of the elongated guide opening is at the end of the opening near the cylinder. Also, the lower engagement shoulder is disposed at the end of the engagement recess near the cylinder. The cylinder groove extends to the piston rod end of the cylinder.

The drag element of such a device may be for example a single-piece component and have in the area of the guide bolts an inner recess. It is provided for example with outwardly projecting guide bolts. The guide bolt remote from the cylinder accommodates for example the piston rod head. In the embodiment, the center lines of the straight section of the elongated guide openings which are arranged for example on the outside of the base part are disposed in the same plane as the center line of the piston rod. The energy storage structure of the acceleration structure includes for example a compression spring, which is arranged for example on the base part and the drag element. Also, in this arrangement, a single piece base part may be provided and a drag element may be provided which extends around the base part and which may be a single piece element or comprise two parts combined to form the drag element.

The combined deceleration and acceleration device with deceleration structures which decelerate the piston when moving out of the cylinder have the same maximum number of components as the device described before.

It is also possible to combine the described embodiments.

What is claimed is:

1. A combined deceleration- and acceleration device (10) pre-installed in a housing (11) and comprising: a base part (21), a drag element (101) supported on the base part (21) so as to be movable thereon between an end position (7) and an opposite park position in which the drag element (101) is held in a form- or force-locking manner, a deceleration structure (41) comprising a cylinder piston unit (42) having a cylinder (51) and a piston (82) with a piston rod (87) being disposed in a vertical longitudinal center plane at one side of the base part (21), with the piston rod (87) being connected to the drag element (101) and an acceleration structure (91) including an energy storage element (92) arranged at the side of the base part (21) opposite the piston (82) and the piston rod (87) and having one end connected to the drag element (101), and the opposite end to the base part (21), the base part (21) being formed integrally with the cylinder (51) receiving the piston (82) of the cylinder, piston unit (42) and forming at least part of a guide structure (31) for the drag element (101), the combined deceleration and acceleration device, before installation thereof in the housing (11), being symmetrical with regard to said vertical longitudinal center plane.

2. The combined deceleration and acceleration device as claimed in claim 1, wherein the deceleration structure (41) and the acceleration structure (91) are effective dependent on a movement direction of the drag element (101) and the piston (82), the movement of the drag element (101) during movement from the park position (6) to the end position (7) being decelerated and the energy of the energy storage structure (92) being released in this direction of movement of the drag element (101).

3. The combined deceleration and acceleration device as claimed in claim 1, wherein the piston (82) of the cylinder piston unit (42) includes at least one piston seal element (71) and divides the cylinder (51) into a compression chamber (43) and a compensation chamber (44), the piston seal element (71) being in contact with the inner cylinder wall (59) at least in the end position of the piston (82) remote from the compression chamber (43) where the compression chamber is not pressurized, the piston seal element (71) being, at least in the end position of the piston at the inner end of the compression chamber (43), not in sealing contact with the cylinder wall (59) wherein the momentary gas flow between the compression chamber (43) and the compensation chamber (44) is also dependent on the stroke direction and the retardation structure (41) is generating a force in a direction opposite the stroke direction.

4. The combined deceleration and acceleration device as claimed in claim 3, wherein at least the compensation chamber (44) is isolated with regard to the ambient (1).

5. The combined deceleration and acceleration device as claimed in claim 3, wherein the compression chamber (43) is disposed between the piston (82) and the bottom end (55) of the cylinder.

6. The combined deceleration and acceleration device as claimed in claim 1, wherein at least the piston (82) and the piston rod (87) of the cylinder piston unit (42) are a single-piece component.

7. The combined deceleration and acceleration device as claimed in claim 1, wherein the energy storage structure comprises a tension spring (92).

8. The combined deceleration and acceleration device as claimed in claim 1, wherein the cylinder (51) has an inner cylinder wall (59) with a cross-section which decreases toward a cylinder bottom end (55).

9. The combined deceleration and acceleration device as claimed in claim 1, wherein the combined deceleration and deceleration device is enclosed in the housing (11).

10. The combined deceleration and acceleration device as claimed in claim 9, wherein the overall length of the device including the housing (11) is less than five times of the piston stroke.

11. The combined deceleration and acceleration device as claimed in claim 1, wherein the drag element (101) includes a stop shoulder (109) with an elastically deformable element (112).

12. The combined deceleration and acceleration device as claimed in claim 1, wherein the end of the piston rod (87) remote from the piston (82) has a head (88) which is accommodated in a recess of the drag element (101).

13. A combined deceleration and acceleration device (10), pre-installed in a housing (11) and including a drag element (101) movable along a guide structure (31) between a force- or form-locking park position (6) and an opposite end position (7), a pneumatic or hydraulic cylinder piston unit (42) including a piston rod (87) connected to the drag element (101) and a deceleration and acceleration structure (91) with an energy storage structure (92) which is charged when the drag element (101) is in the park position (6), the combined deceleration and acceleration device (10) having a base part (21) comprising the cylinder (51) of the cylinder piston unit (42) disposed in a vertical center plane at one side of the base part (21) and at least part of a guide structure (31) movably supporting the drag element (101), and the energy storage structure (92) being disposed in the vertical center plane at the side of the base part guide structure (31) opposite the cylinder piston unit and connected to the base part (21) and to the drag element (101), the combined deceleration and acceleration device (10), before installation thereof in the housing (11), being symmetrical with regard to the longitudinal vertical center plane of the device.

* * * * *